(12) United States Patent
Heisler (10) Patent No.: US 8,539,734 B2
(45) Date of Patent: Sep. 24, 2013

(54) ROOF TRUSS COMPATIBLE FOR SOLAR PANELS

(71) Applicant: Eco Solar Generation, LLC, San Mateo, CA (US)

(72) Inventor: Robert E. Heisler, San Mateo, CA (US)

(73) Assignee: Eco Solar Generation LLC, San Mateo, CA (US)

( * ) Notice: Subject to any disclaimer, the term of this patent is extended or adjusted under 35 U.S.C. 154(b) by 0 days.

(21) Appl. No.: 13/771,080

(22) Filed: Feb. 20, 2013

(65) Prior Publication Data

US 2013/0160396 A1    Jun. 27, 2013

Related U.S. Application Data

(62) Division of application No. 12/874,168, filed on Sep. 1, 2010, now Pat. No. 8,397,447.

(60) Provisional application No. 61/324,712, filed on Apr. 15, 2010.

(51) Int. Cl.
*E04D 13/18* (2006.01)
*E04D 13/03* (2006.01)
*E04B 7/04* (2006.01)

(52) U.S. Cl.
USPC ............ 52/745.2; 52/745.19; 52/745.06; 52/173.3; 52/200; 52/634; 126/623; 126/621

(58) Field of Classification Search
USPC ........... 52/91.3, 90.1, 91.1, 173.3, 171.1, 52/200, 634, 633, 745.2, 745.19, 745.05, 52/745.02, 745.06; 126/623, 621, 622; 136/244, 245
See application file for complete search history.

(56) References Cited

U.S. PATENT DOCUMENTS

| | | |
|---|---|---|
| 4,162,595 A | 7/1979 | Ramos |
| 4,178,912 A | 12/1979 | Felter |
| 4,238,912 A | 12/1980 | MacDonald |
| 4,239,031 A | 12/1980 | Granger |
| 4,466,424 A | 8/1984 | Lockwood |
| 4,526,161 A | 7/1985 | Kaicher |
| 5,036,833 A | 8/1991 | Quigley |
| 5,092,939 A | 3/1992 | Nath |
| 5,125,608 A | 6/1992 | Mcmaster et al. |
| 5,367,843 A | 11/1994 | Hirai |

(Continued)

FOREIGN PATENT DOCUMENTS

| | | |
|---|---|---|
| JP | 10131442 | 5/1998 |
| JP | 2001012039 | 1/2001 |

*Primary Examiner* — Phi A
(74) *Attorney, Agent, or Firm* — The Mueller Law Office, P.C.

(57) ABSTRACT

A roof truss compatible for solar energy panels, and a method for installing the roof trusses, incorporates a non-structural top chord that may have a removable portion removed and replaced by a solar assembly. The truss is structurally designed to support the solar assembly without the presence of the non-structural top chord. A desired length of the non-structural top chord may be omitted or removed during manufacture of the truss, or may be removed at a future time for installation of solar panel assemblies. A solar assembly for inserting into the solar roof truss may include a panel enclosure which has a channel for holding a solar panel, where the panel is installed approximately flush with the roof line. The panel enclosure may have an air space underneath the solar panel, to allow for cooling air flow and water drainage.

11 Claims, 9 Drawing Sheets

(56) References Cited

U.S. PATENT DOCUMENTS

| | | | |
|---|---|---|---|
| 5,505,788 A | 4/1996 | Dinwoodie | |
| 5,531,049 A | 7/1996 | Hirai | |
| 5,706,617 A | 1/1998 | Hirai | |
| 6,182,403 B1 | 2/2001 | Mimura | |
| 6,415,580 B2 | 7/2002 | Ojala | |
| 6,470,644 B2 * | 10/2002 | James et al. | 52/745.06 |
| 6,563,040 B2 | 5/2003 | Hayden et al. | |
| 6,901,708 B1 | 6/2005 | Powers | |
| 7,012,188 B2 | 3/2006 | Erling | |
| 7,185,471 B2 | 3/2007 | Schmerber | |
| 7,260,918 B2 | 8/2007 | Liebendorfer | |
| 7,434,362 B2 | 10/2008 | Liebendorfer | |
| 7,797,905 B1 | 9/2010 | Smalley | |
| 7,913,710 B2 * | 3/2011 | Bougioukos | 135/87 |
| 8,091,291 B2 * | 1/2012 | Ode | 52/93.1 |
| 8,122,681 B2 * | 2/2012 | Wrass et al. | 52/746.11 |
| 8,266,846 B2 | 9/2012 | Schoell | |
| 8,336,277 B1 | 12/2012 | Rego et al. | |
| 2008/0035140 A1 | 2/2008 | Placer et al. | |
| 2008/0190047 A1 | 8/2008 | Allen | |
| 2008/0236058 A1 | 10/2008 | Antonie | |

* cited by examiner

ROOF TRUSS COMPATIBLE FOR SOLAR PANELS

RELATED APPLICATIONS

This application is a divisional of U.S. patent application Ser. No. 12/874,168 filed Sep. 1, 2010, entitled "Roof Truss Compatible for Solar Panels", which claims priority to U.S. Provisional Patent Application Ser. No. 61/324,712 filed Apr. 15, 2010, entitled "Solar Roof Truss and Embedded Solar Energy System," both of which are hereby incorporated by reference for all purposes.

BACKGROUND OF THE DISCLOSURE

Rooftop solar energy systems are a common mode for installing solar panels on a building. Solar panels may be retrofitted on top of existing roofs, or may be incorporated into a roof during new construction. For retrofit installations on top of an existing roof, each installation must be built as a custom design for each home and be engineered to satisfy local authority inspectors, both of which make retrofits a costly process. Retrofits can compromise the integrity of a roof, be visually unappealing, and incur high labor and material costs. The structural design of the supporting roof trusses may require modification or rebuilding in order to make them compatible with the solar panels being installed.

Solar energy systems may also be incorporated into a roof during construction of the building instead of being retrofitted. For instance, various designs for photovoltaic panels, fluid heat exchangers, and heated air systems to be installed on top of a roof or built into the underlying roof structure have been seen in the art. However, such custom approaches require specialized structures that must be incorporated into the design of the building itself. Solar roof tiles and shingles for use as a roofing material are another approach for installing solar components into new roofs. Solar roof tiles and shingles provide a more visually appealing surface, but can also require retrofitting of the roof structure and be costly.

Thus, there remains a need for solar rooftop systems which reduce cost, improve standardization, and are easy to install while maintaining reliability and maintainability.

SUMMARY OF THE DISCLOSURE

A roof truss compatible for solar energy panels and method of installing the solar panels into a roof having the roof trusses is disclosed. The roof truss incorporates a non-structural top chord that may have a removable portion removed and replaced by a solar assembly. The truss of the present invention is structurally designed to support the solar assembly without the presence of the non-structural top chord. In some embodiments, the non-structural top chord is omitted or removed during manufacture of the truss. In other embodiments, the solar roof trusses may be covered with roofing material, and then the roofing material and a portion of the non-structural top chord removed at a future time to make them suitable for installation of solar panel assemblies. The non-structural chord has an upper surface defining the roof line, so that the installed solar assembly may be installed approximately flush with the roof line.

A solar assembly for inserting into the solar roof truss is also disclosed. The solar assembly includes a panel enclosure which has a channel for holding a solar panel, the channel being located near an upper edge of the panel enclosure. In some embodiments, the panel enclosures may be longitudinal and configured to slidingly receive a row of solar panels. The panel enclosure may have an air space underneath the solar panel, to allow for cooling air flow and water drainage.

BRIEF DESCRIPTION OF THE DRAWINGS

Reference now will be made in detail to embodiments of the disclosed invention, one or more examples of which are illustrated in the accompanying drawings.

FIGS. 1A-1B are front views of an embodiment of a roof truss of the present invention, including a non-structural top chord;

DETAILED DESCRIPTION OF THE EMBODIMENTS

A solar roof truss compatible for installation of a solar energy assembly is disclosed, in which the solar roof truss allows the option of installing the solar energy assembly during construction of a building or at a future time. The solar roof truss is pre-engineered to house a solar assembly and support the weight thereof, thus reducing the cost of retrofitting if the panels are installed at a future time. A non-structural member is incorporated into a roof truss to provide space for a solar assembly. The non-structural member is positioned to define the roof line of a building such that the solar assembly may be installed approximately flush with the roof line. For the purposes of this disclosure, "roof line" shall refer to a finished roof, such as the top surface of shingles, tiles, shake, or other type of roofing material installed onto the roof. The non-structural member can be configured into standard roof truss designs, which allows for a visually appealing solar rooftop system without requiring custom or specialized systems to accommodate solar components. Furthermore, the solar roof trusses are amenable to various sizes of solar arrays.

Figure 1A:
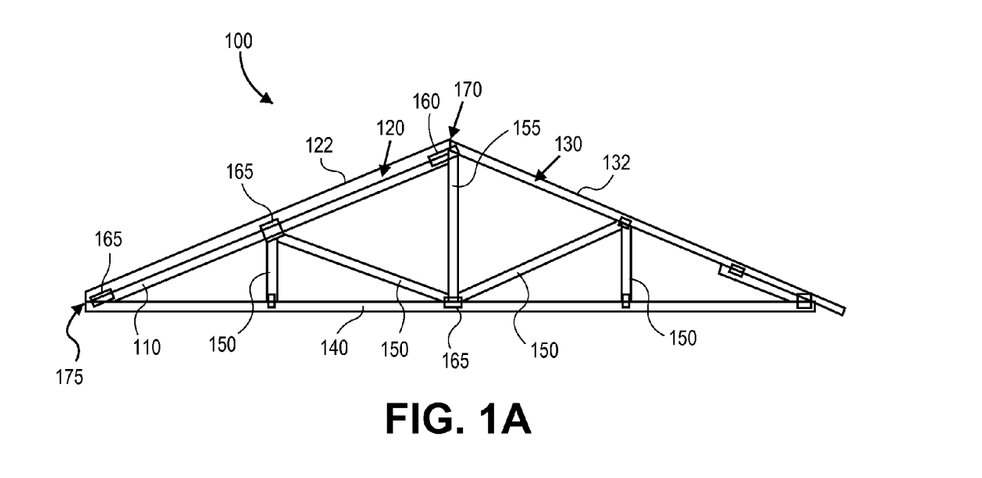
Figure 1B:
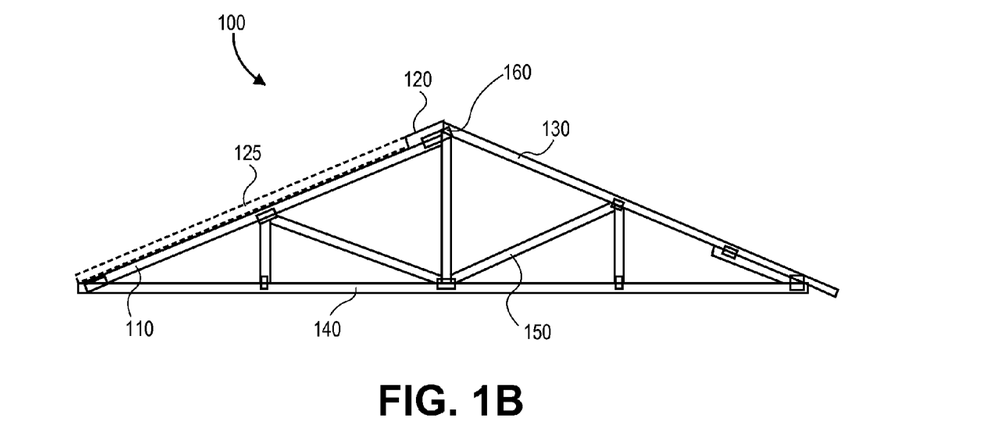
FIG. 1B depicts the roof truss of FIG. 1A with a portion of the non-structural top chord removed.

FIGS. 1A and 1B show an embodiment of a solar roof truss 100 of the present invention. Truss 100 includes a top chord 110 in one half of the truss 100, a non-structural top chord 120 above top chord 110, and another top chord 130 in the second half of the truss. Truss 100 also includes a bottom chord 140, web members 150, a central post 155, a peak truss plate 160, and truss plates 165. Truss members 110, 120, 130, 140, and 150 may be standard lumber sizes such as 2"×4" and 2"×6", or other sizes as required to meet the necessary building specifications. While typically all members of a truss are structural components, the solar roof truss 100 beneficially provides the non-structural top chord 120 to enable the truss 100 to be compatible for installation of a solar assembly at a present or future time. Non-structural top chord 120 serves as a dummy chord, preserving a space into which solar panels may be embedded. When non-structural top chord 120 is full length, extending from the peak 170 of the truss to the heel 175 at the gutter line of the truss as in FIG. 1A, the roof may be entirely covered with roofing material without any solar panels. When the non-structural top chord 120 has only a partial length present, as in FIG. 1B, the removable length of non-structural top chord 120, as indicated by the dashed lines 125, allows for placement of a solar assembly.

The truss 100 is designed to support the weight of a solar assembly without the presence of top chord 120. That is, non-structural top chord 120 is a non-load bearing member of truss 100, with its length—whether full length or partial—not impacting the structural integrity of the truss 100. In some embodiments, the non-structural top chord 120 may be initially manufactured as a partial length. When manufactured with a partial length, the removable portion of the non-structural chord is not a physical piece but may be defined as the space continuing from the partial length and extending from down to the heel of the truss. In other embodiments, the truss 100 may be manufactured and installed into a building with a full-length non-structural top chord 120, with the full length being divided or cut at a future time into a partial length and a removed length. The future time can be at the discretion of a user, such as months or years after being built into a roof. The non load-bearing top chord 120 establishes a space into which a solar assembly may be installed, which advantageously enables a building to be compatible for solar energy panels at any time during the life of the building. Because the truss 100 is designed to support the weight of a solar assembly, retrofitting and re-engineering of a roof, along with the associated costly permits and inspections, may be reduced or eliminated.

In the embodiment of FIG. 1B, only a partial length of top chord 120 near truss plate 160 at the peak of the truss 100 is present. As described above, the non-structural top chord 120 may be manufactured with a partial length. In other embodiments, the non-structural top chord 120 may be manufactured with a full length, with the full length being cut and a portion removed in the field, after installation into a roof. Top chord 120 may be shortened by cutting at a desired location along its length, according to the size of the solar assembly to be installed, and then removing any truss plates 165 attaching top chord 120 to the roof truss 100. In FIG. 1B, the space 125 vacated by the removed portion of top chord 120 provides a recessed area into which a solar assembly may be inserted. Because the space 125 is recessed, the resulting embedded solar energy system has a visually appealing benefit of being approximately flush with the roof line. Having the roof line flush with the solar assembly also minimizes shading effects of the surrounding roof on the solar panels. In one embodiment, for example, the top chord 120 may be a 2×6" chord, resulting in a vacated space 125 having a six inch height for a solar assembly to be installed. In another embodiment, a solar assembly may be seated only partially into the depth of the recessed space to accommodate thicker roofing materials such as tile. For example, an installed solar assembly may protrude two inches above the surrounding trusses, or rough roof, to allow tiling material to fill the remaining two inch height up to the edge of the solar assembly. In other embodiments the solar assembly may extend any height above the surrounding trusses as required to accommodate the thickness of the particular roofing material to be used, so that the solar assembly is approximately flush with the finished roof line.

In the embodiment of FIG. 1B, a majority of chord 120 has been removed, allowing for multiple solar panels to be installed in the space 125. Use of the solar roof trusses 100 allows for a modular solar roof design, in that number of trusses 100 to be removed, and the length of non-structural chord 120 to be cut, may be tailored to the number and size of solar panels desired for installation.

The non-structural top chord 120 is positioned in the truss 100 such that the upper surfaces 122 and 132 of top chords 120 and 130 define a roof line for a building into which the truss 100 will be incorporated. The structural top chord 110 is therefore below the desired roof profile. In embodiments where the non-structural top chord 120 is initially manufactured with only a partial length, the roof line would be defined by a line extending along of the upper surface 122 of the partial length toward the heel 175 of the truss 100; that is, the upper surface of where a full-length chord would be if present. The truss 100 may be configured in a conventional truss pattern, such as the Howe-type design as embodied in FIGS. 1A and 1B. In other embodiments, other standard trusses may be used as the basis of a solar roof truss. In embodiments in which a conventional truss is modified with a non-structural chord, the non-structural chord would take the place of a standard top chord, similar to FIG. 1A, and the standard top chord would be positioned below the non-structural chord.

Figure 1C:
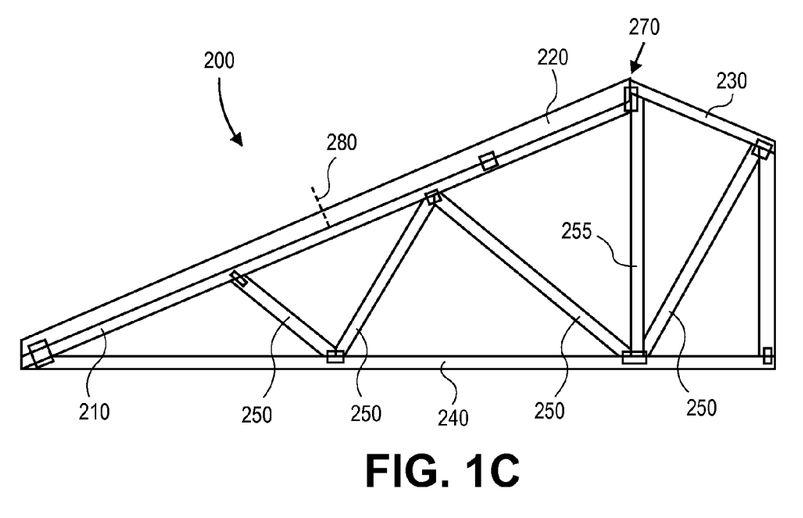
FIG. 1C is a front view of another embodiment of a roof truss of the present invention.

FIG. 1C, for example, illustrates a solar roof truss 200 based on a Fink-type of standard truss, in which all web members are angled except for a vertical central post. Similar to solar roof truss 100 of FIGS. 1A-1B, solar roof truss 200 of FIG. 1C has a structural top chord 210, a non-structural top chord 220, a second structural top chord 230, a bottom chord 240, web members 250, and a central post 255. Non-structural top chord 220 may be cut at any distance from peak 270. In the embodiment of FIG. 1C, for example, a cut line 280 is shown in which approximately half of the lower portion of non-structural top chord 220 will be removed. The cut length of non-structural top chord may be determined according to the dimensions of the solar assembly to be installed, which may include a single panel or an array of many panels.

In embodiments in which the solar roof truss is based on a conventional truss, the solar roof truss advantageously reduces the cost of custom-built designs for installing solar panels. In yet other embodiments, the non-structural top chord may be built into a custom-designed truss, for instance to meet the designs of a specific building. Embodiments of the solar roof trusses of the present invention may be applicable to various types of building, including but not limited to residential, commercial, warehouses, and carports.

While the top chord 120 of FIGS. 1A and 1B is shown as a single chord, or rafter, immediately adjacent to top chord 110, other variations are possible for configuring a non-structural chord to provide a space for a solar assembly. For example, the non-structural top chord 120 and top chord 110 may have a vertical space between them. In an example of such an embodiment, a non-structural top chord may be a 2"×4" chord, to save weight and/or cost compared to a 2"×6" chord, and be attached to a structural top chord with 2" high blocks in order to achieve a desired 6" space for solar assemblies. In another embodiment, the non-structural top chord may be configured from multiple pieces, such as multiple pieces placed end to end, or multiple pieces stacked vertically. In any variations, the non-structural top chord remains characterized in that it preserves a length and a vertical space sufficient for installing a solar assembly, and is positioned with its upper surface defining a roof line. Other embodiments for positioning a non-structural top chord with a desired height relative to the structural top chord may be achieved by one of ordinary skill in the art without departing from the scope of the invention herein.

Figure 2:
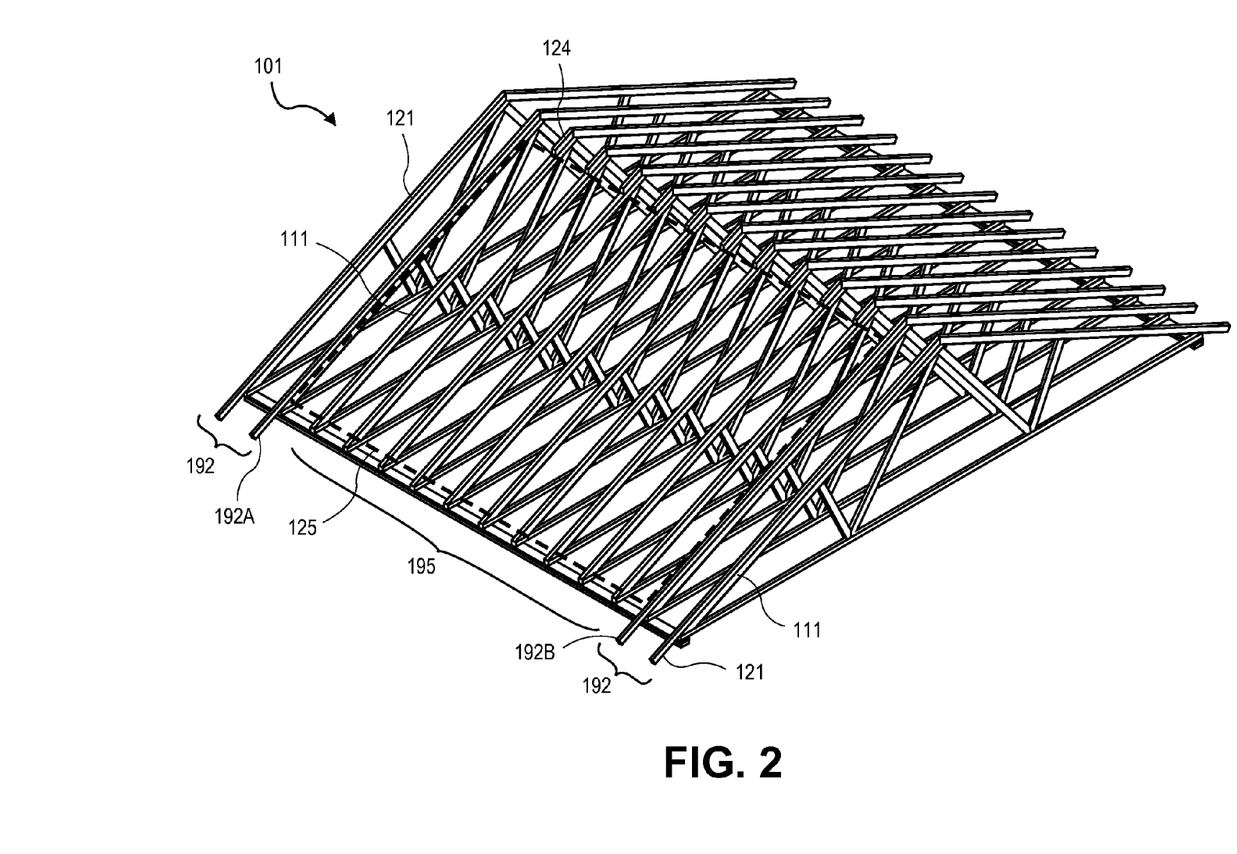
FIG. 2 is a perspective view of an embodiment of a plurality of roof trusses of the present invention.

FIG. 2 shows a plurality 190 of roof trusses 101 installed into a roof. Trusses 101 are similar to the roof trusses 100 of FIGS. 1A and 1B, but embodied with web members in a different exemplary truss structure. Intact trusses 192 at the ends of the plurality 190 have the top chord 121 intact, while a cut subset 195 between the intact trusses 192 of the roof have only a partial length 124 of the non-structural top chord provided. The removable sections of the non-structural top chords—which as described above may be a piece removed from a full-length chord, or which may represent the space where a full-length chord would have occupied in the case of the truss being built with a only partial length—provide the recessed space 125 into which a solar assembly may be inserted. The number of trusses selected for cut subset 195 may be as few as one or up to any number as needed to accommodate the size of a desired solar assembly. In one embodiment, when the cut subset 195 includes all of the solar roof trusses present, intact trusses 192 bordering the cut subset 195 may be conventional or other non-solar roof truss. Similarly, the removed length, that is the full length of the non-structural top chord minus the partial length remaining in the cut subset, may embody any length to enable insertion of the particular solar assembly. The recessed space 125 has dimensions defined by a) a height from the upper surface of a structural chord 111 to the upper surface of non-structural chord 121, b) a width spanning from trusses 193 and 194 bordering the cut subset 195, and c) a length of the removed portion of the non-structural chords in the cut subset 195. In some embodiments, strapping may be added as required for the envelope effect on the building.

Figure 3A:
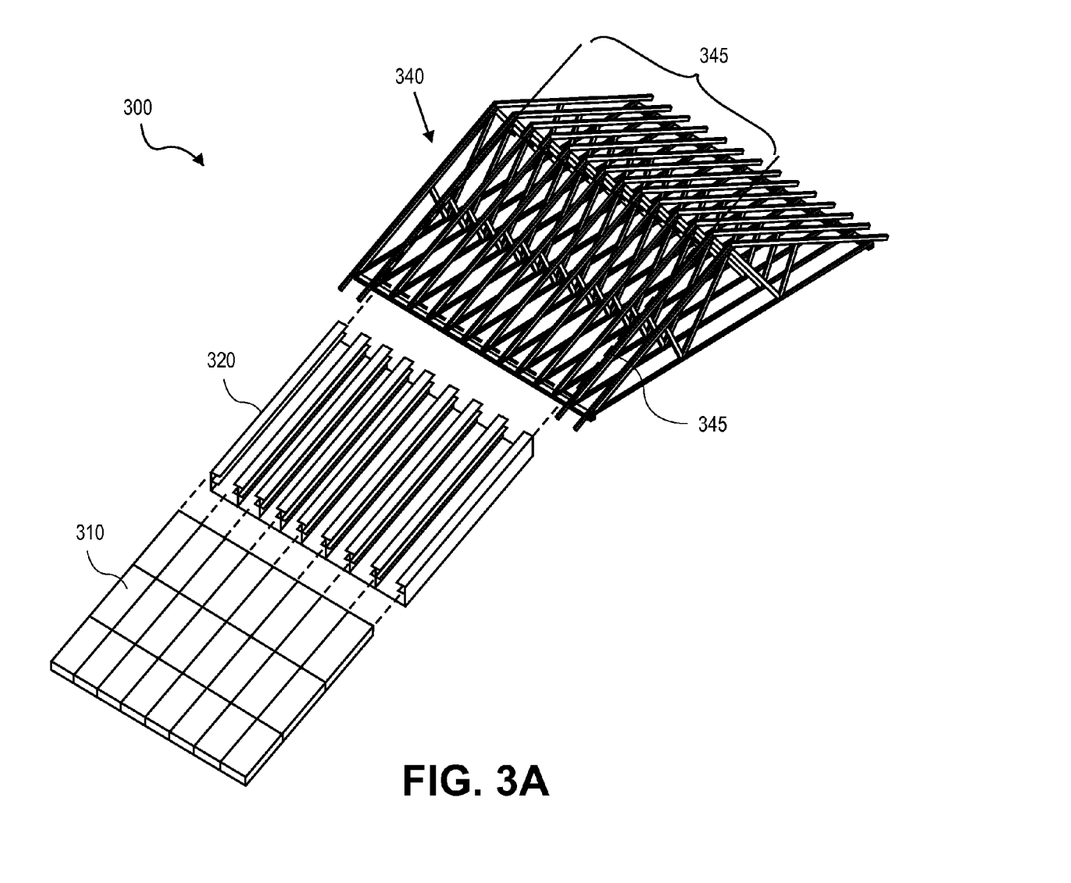
FIG. 3A shows a simplified exploded perspective view of a rooftop energy system of the present invention.
Figure 3B:
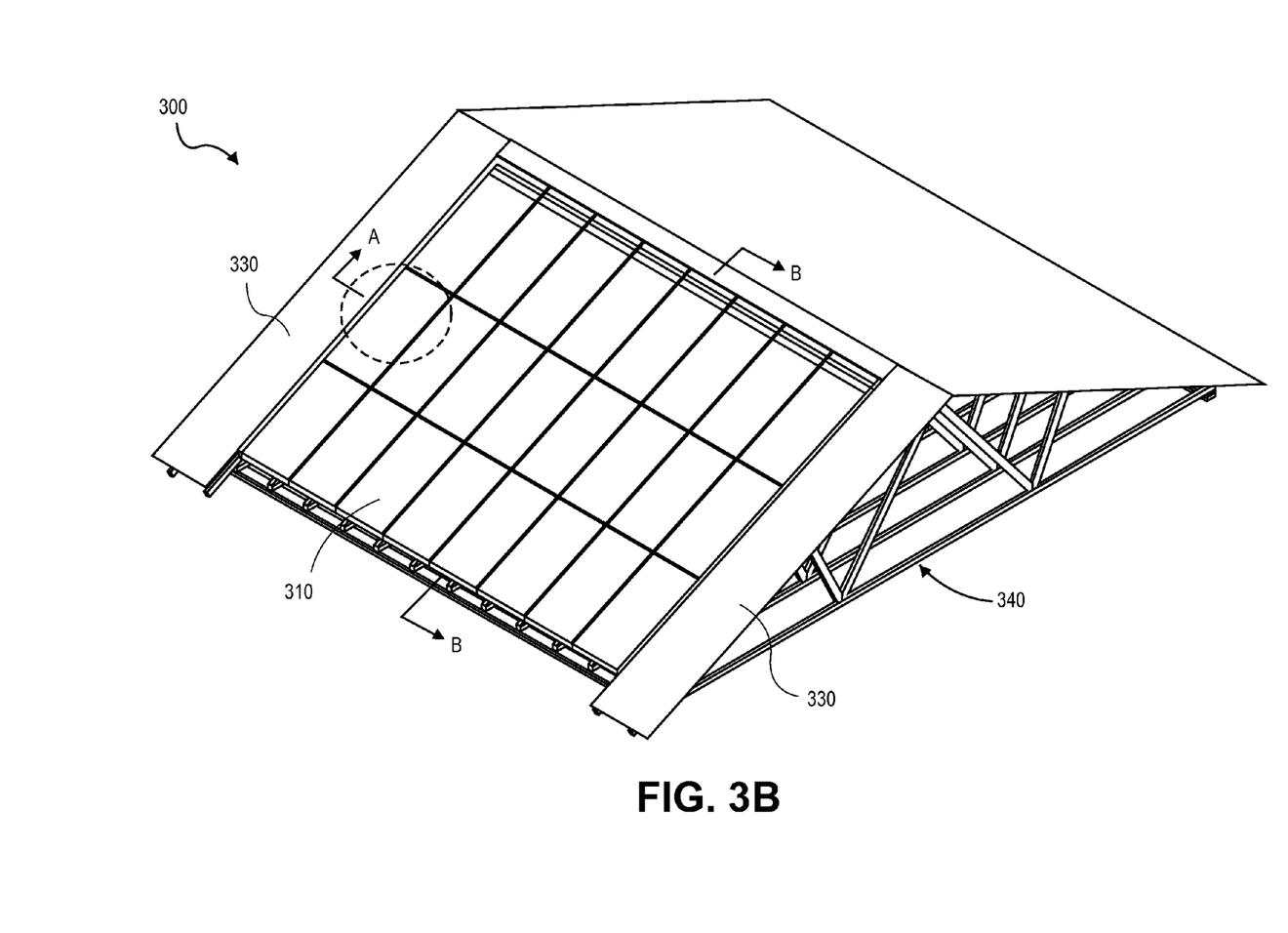
FIG. 3B shows an assembled perspective view of the system of FIG. 3A.

FIGS. 3A and 3B depict an example of how a solar assembly may be installed into a solar roof truss system. FIG. 3A provides a simplified exploded view of the assembled rooftop solar energy system 300 shown in FIG. 3B. The system 300 includes solar panels 310, panel enclosures 320, roofing material 330 covering the roof area around the solar panels 310, and a plurality of roof trusses 340. In this embodiment, panel enclosures 320 are longitudinal pans placed in the recessed area 345 of roof trusses 340. A backing sheet such as plywood (not shown) may be placed under the pans to provide weatherproofing. The solar panels 310 are then placed into the panel enclosures 320. Roofing material 330 may be any material known in the art such as composition, shake, slate, or tiles. Solar panels 310 and panel enclosures 320 may be installed at the same time that roof trusses 340 are constructed into a building. Alternatively, roof trusses 340 may be constructed into the building with all of the non-structural chords being full-length, making the roof compatible for solar panels 310 and panel enclosures 320 to be installed at a future time as a replacement for any roofing material that previously had been covering the entire roof. While solar energy system 300 is shown in FIGS. 3A-3B as an array of twenty-four solar modules, any number and arrangement of modules is possible. For instance the solar assembly 300 may be one large single panel, or one row of three panels, or an array of any number of panels for achieving the desired power output.

Figure 4:
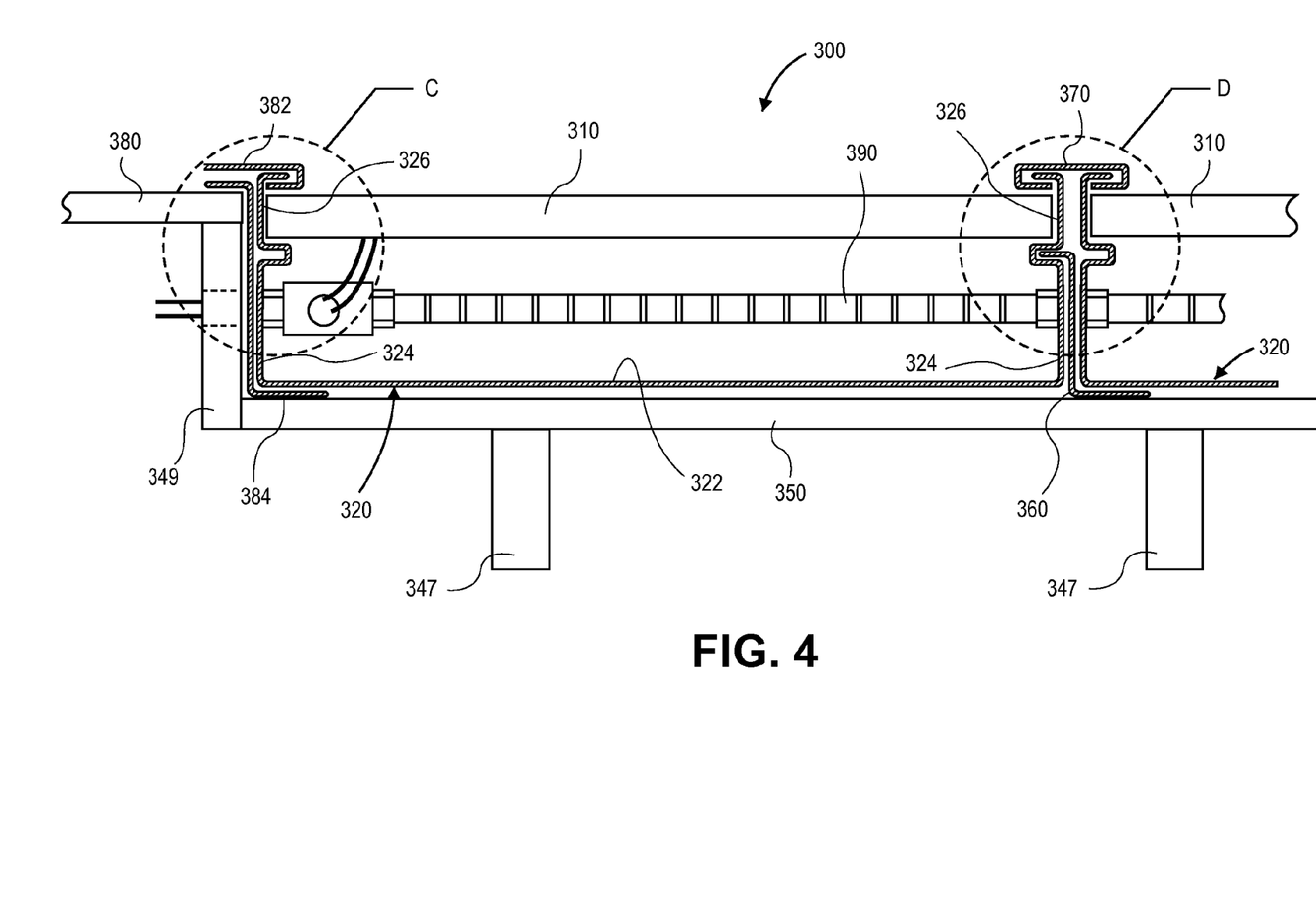
FIG. 4 illustrates a cross-sectional view of a solar assembly installed into a roof, corresponding to section "A" of FIG. 3B.

FIG. 4 depicts a cross-sectional view of section A of FIG. 3B, detailing an embodiment of solar assembly 300 installed into a roof. Solar assembly 300 is mounted into the recessed space bordered by structural top chord 347 on the bottom and non-structural top chord 349 in a bordering truss to the side. Solar assembly 300 includes panel enclosure 320, solar panel 310 mounted into panel enclosure 320, a backing sheet 350, a bracket 360, and a cleat 370. Also shown in FIG. 4 are a roofing sheet 380, flashing 382, optional end bracket 384, and electrical conduit 390. Backing sheet 350 may be, for example, a plywood sheet. Bracket 360, cleat 370, and end bracket 384 may be fabricated from, for example, sheet metal or plastic. Flashing 382 may be standard roof flashing materials known in the industry. Note that panel enclosure 320, bracket 360, cleat 370, end bracket 384 and flashing 382 are depicted in FIG. 4 as having space between parts for clarity, but in actual construction may be seated immediately adjacent to each other. Roofing sheet 380 may be, for example, a plywood sheet onto which composition roofing, tiling, or other roofing material may be mounted. Additional materials may be inserted within the solar assembly 30 as desired to provide further weatherproofing—such as plastic sheeting between backing sheet 350 and panel enclosure 320, sealants, and caulking.

In the embodiment of FIG. 4, panel enclosure 320 has a bottom surface 322 and two side walls 324, with channels 326 near the upper edges of the side walls 324. Having the channels 326 positioned near the upper edges of the side walls 324 results in solar panels 310 being approximately flush with the surrounding roof line. In other embodiments as described above, the upper edges of side walls 324 may protrude above the height of the backing sheet 380 to accommodate the thicknesses or heights of various roofing materials. Panel enclosure 320 may be formed from, for example, sheet metal. In some embodiments, the panel enclosure 320 may be 20-28 gauge stainless steel. Channels 326 in the embodiment of FIG. 4 are in a "C" shape, allowing solar panel 310 to be slid into the channels 326. Having channels 326 receive solar panels 310 in a sliding manner beneficially retains the solar panels 310 within the enclosures 320 while allowing for easy removal of the solar panels 310 for maintenance or replacement. Other configurations for channels 326 are possible, such as an "L" shape in which panels are vertically inserted into the enclosure. The channels 326 in FIG. 4 are embodied as integrally formed into panel enclosure 330, by being bent at successive angles to form the "C" shape. Having channel 326 formed integrally may reduce component and manufacturing costs of the panel enclosure 320.

In one embodiment of installing solar panels 310 into a roof, a first solar panel 310 is slid into the enclosure 320, and positioned at the uppermost position of the recessed space, toward apex of the roof. Any subsequent solar panels to be installed may then be slid into place, until the desired number of panels are stacked in a row along the panel enclosure. The bottom-most panel may then be retained in place by holding mechanisms including but not limited to cotter pins, retaining clips, clasps, brackets, and the like. Individual panels may be easily accessed for repair or replacement by releasing the holding mechanism from a particular row, and then sliding out one or more panels for servicing.

The panel enclosure 320 may be one longitudinal piece continuously extending from the gutter line of the roof toward the peak of the truss such as depicted in FIG. 3A. In other embodiments, such as in FIG. 8, the panel enclosure 320 (430 in FIG. 8) may include multiple segments pieced together lengthwise. Shorter enclosure segments may advantageously facilitate handling of the panel enclosures during transport or installation.

Figure 5:
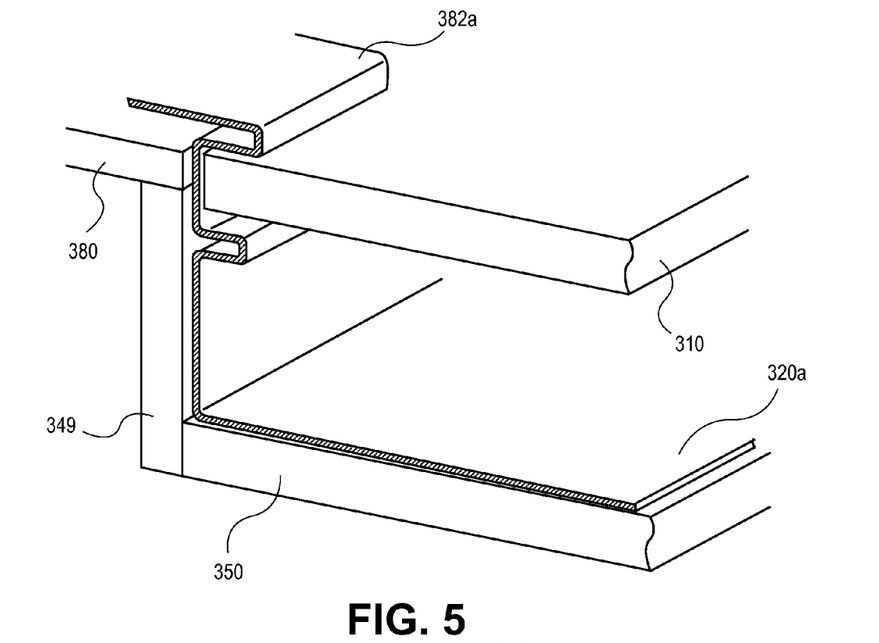
FIG. 5 is a perspective view of end section C of FIG. 4.
Figure 6:
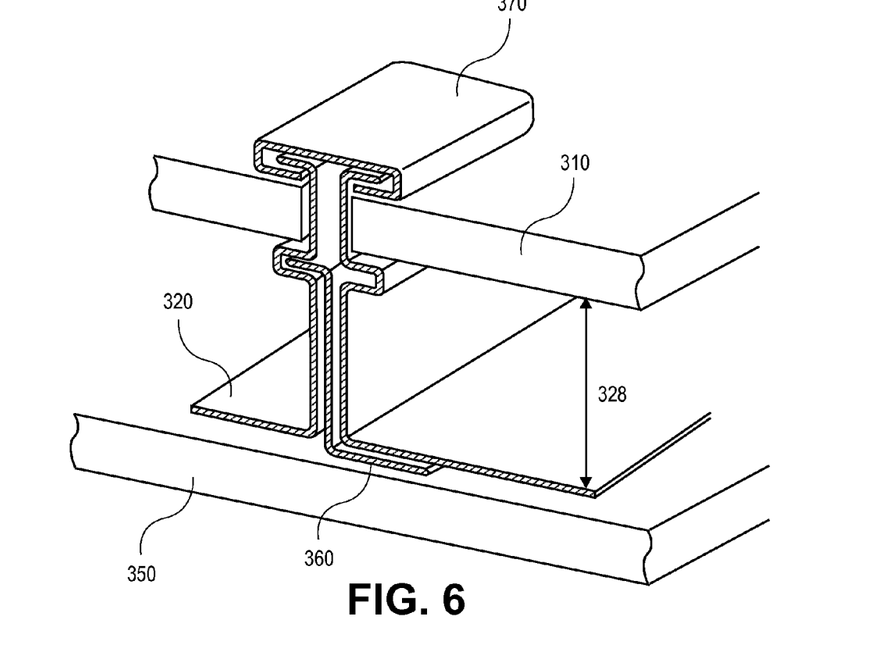
FIG. 6 is a perspective view of mid-section D of FIG. 4.

Further details of FIG. 4 may be seen in combination with the perspective views of FIG. 5 and FIG. 6. FIG. 5 depicts end section C of FIG. 4, where the panel enclosure 320 abuts non-structural top chord 349 of a bordering truss, while FIG. 6 depicts mid-section D, between adjoining panel enclosures. Note that for FIG. 5, non-structural top chord 349 may instead be the top chord of a conventional or other truss, in instances where it is desired to use a standard truss in areas where solar panels are not installed. FIG. 5 depicts an embodiment in which bracket 384 of FIG. 4 has been omitted, and in which flashing 382a has been incorporated as an integral extension of panel enclosure 320a. Having flashing 382a integral with panel enclosure 320a may reduce manufacturing and installation costs. Flashing 382a may include optional features such as a lip or groove at its terminating end, not shown, to facilitate joining the flashing to adjacent roofing material. Panel enclosure 320 is mounted on backing sheet 350, which may be, for example, plywood. Backing sheet 350 is located on the upper surfaces of top chords 347, and serves to seal the roof from the interior of the building. Panel enclosures 320 are joined and sealed to each other by joining elements embodied as bracket 360 and cleat 370 in FIG. 6. Brackets 360 may be mounted to backing sheet 350 by, for example, nails, screws, adhesive, or other fastening materials. Bracket 360 and cleat 370 may be formed from materials including, but not limited to, sheet metal, plastic, or composites.

In the embodiment of FIGS. 4 and 6, bracket 360 has a bottom tab hooking underneath one panel enclosure 320 and a top tab inserted into a slot in a neighboring panel enclosure 320, where the detent is formed by the bottom edge of the channel 326. Bracket 360 connects adjacent enclosures 320 to each other, and also provides additional structural support for the solar assembly 300, for instance to support loads from environmental stresses or the weight of personnel when performing maintenance. Cleat 370 is slid over the top lip of channel 326, and may be secured and sealed to enclosure 320 by one or all of various methods including crimping, caulking, bonding, welding, or other joining processes known in the art. Cleat 370 may be a continuous piece extending the entire length of a row of panel enclosures 320, or may be multiple pieces joined together in a lengthwise fashion. The overlapping natures of bracket 360 and cleat 370 with the panel enclosures 320 provide a waterproof seal between panel enclosures 320. Other joining elements are possible, such as brackets of other shapes, clamps, clips, interlocking tabs, and the like.

Figure 7:
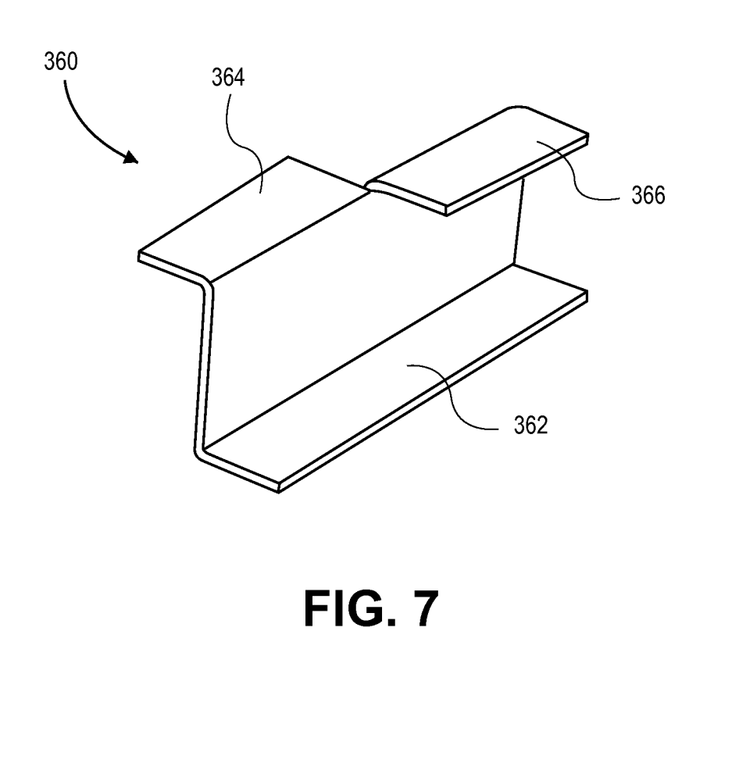
FIG. 7 depicts a perspective view of an embodiment of a joining bracket of the present invention.

A perspective view of one embodiment of bracket 360 is shown in FIG. 7. Bracket 360 has a bottom tab 362, a first upper tab 364 and a second upper tab 366. Tab 364 folds to one side of the bracket 360 while tab 366 folds to the opposite side, beneficially enabling the bracket 360 to secure two adjoining enclosures. Multiple brackets 360 may be placed along the length of a panel enclosure 320 for securing the enclosures 320 to each other and to the backing sheet 350. In another embodiment, the bracket 360 may be sufficiently long to stabilize the entire length of the panel enclosure with the use of the one single bracket. The bottom tab 362 may be fastened to backing sheet 350 by nails, screws, or other fasteners known in the art.

Figure 8:
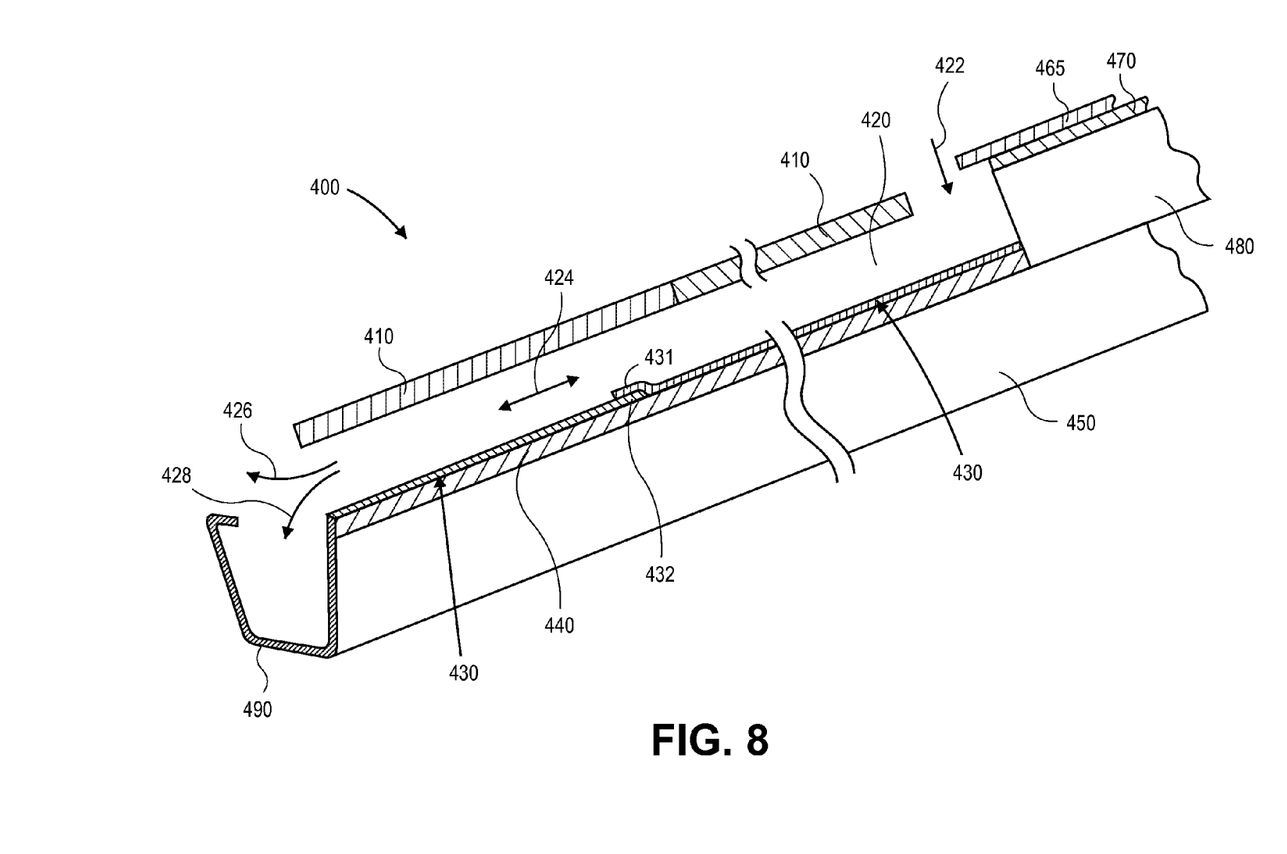
FIG. 8 is a cross-sectional view corresponding to an embodiment of section "B" of FIG. 3B.

Returning to FIG. 6, an air space 328 between the solar panel 310 and the panel enclosure 320 is shown. The air space 328 allows for air circulation to cool the solar panels 310, and also to allow for drainage of water, such as rain or other precipitation, to empty into a gutter. FIG. 8 illustrates an embodiment of the air and water circulation path for a solar assembly 400, shown in a cross-section from the gutter line at the heel of the truss to the peak of a roof (e.g., section "B" of FIG. 3B), taken through a mid-portion of a row of solar modules.

In FIG. 8, solar modules 410 have an air space 420 between the underside of solar modules 410 and the bottom of the panel enclosures 430. The panel enclosures 430 are placed on top of a backing sheet 440, which is mounted on structural top chord 450 of a supporting truss. The solar assembly 400 is bordered toward the peak end of the roof by non-structural top chord 480 and a roofing sheet 470, onto which flashing 465 is mounted. Roofing sheet 470 is mounted onto the partial length of non-structural top chord 480. Flashing is coupled to surrounding roofing material, not shown. The solar panels 410 are positioned to leave a gap 422 between the solar panel and adjacent roofing. As shown by arrows 422, 424, 426, and 428, the gap 422 is fluidly connected to air space 420 between solar panels 410 and bottom of panel enclosures 430, allowing water drainage and air currents to flow underneath the solar panels 410. Circulating air currents 424 and 426 may provide beneficial cooling to the solar panels 410. The air space 420 also allows for precipitation to drain (arrow 428) to the gutter 490, and for debris to be flushed out from underneath the panels 410. In one exemplary embodiment, for a solar roof truss system in which a non-structural chord is a 2"×6" chord, the chord height allows six inches of total space to be available for a solar assembly to be embedded. The air space 420 may consequently have a height of approximately two to four inches, depending on the thickness of the solar modules, backing sheet, and other components installed into the assembly.

In the embodiment of FIG. 8, multiple panel enclosures 430 are utilized to span the length of the solar assembly 400. In this embodiment, the lip 431 of one panel enclosure is configured to fit into the end 432 of the adjoining enclosure, so that the lip 431 forms a water-resistant overlapping joint. The enclosures 430 may be joined by other methods, such as tabs, slots, crimps, screws, sealants, or other joining methods known in the art. Alternatively, one panel enclosure may extend the entire length as described in previous embodiments.

Electrical connections between solar panels may be connected via conduits that run through pre-drilled holes in the side of each pan, underneath solar modules, as illustrated in FIG. 4. The conduit may then be routed to an inverter mounted near a main panel. If micro-inverters are used—that is, inverters for each individual solar module—the conduit may go directly to the main house panel instead of having a single inverter for the array. Other wiring embodiments are possible. For instance, individual solar modules may be connected in series or parallel, and may have a common ground wire.

Note that although embodiments have been shown with a plurality of solar roof trusses, a single solar roof truss may be utilized. In such an embodiment, the recessed space for a solar assembly would have a width spanning from an adjacent truss, across the single solar roof truss, and to the adjacent truss on the other side of the solar roof truss. Furthermore, while the recessed spaces for solar assemblies are depicted in this disclosure as being bordered on either side with trusses, other types of end surfaces other than trusses may instead enclose the edges of the recessed space. Alternative end surfaces may include, for example, walls made of concrete, plywood, brick, sheet metal or other material. The end surfaces need only to be spaced apart from the one or more solar roof trusses with enough distance to provide space for a solar assembly. Additionally, other types of solar assemblies may be installed into the solar roof trusses described in this disclosure.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

What is claimed is:

1. A method for installing solar panels into a roof, comprising:
    installing a roof truss, the roof truss comprising:
        a structural top chord having a first upper surface; and
        a non-structural top chord above the structural top chord, wherein the non-structural top chord has a second upper surface, wherein a line extending along the second upper surface from a peak to a heel of the roof truss defines a roof line, and wherein the non-structural top chord comprises a partial length and a removable portion;
        wherein the roof truss is designed to accommodate the weight of a solar panel assembly after the removable portion of the non-structural top chord is removed; and
    providing end surfaces facing and spaced apart from both sides of the roof truss;
    wherein when the removable portion is removed, a recessed space is established having dimensions defined by a) the length of the removed portion of the non-structural top chord, b) a height from the first upper surface to the second upper surface, and c) a width spanning between the end surfaces; and
    wherein the recessed space is suitable for holding a solar panel assembly.

2. The method of claim 1 wherein the non-structural top chord further comprises a full length extending from the peak to the heel of the roof truss, and wherein the full length is divided into the partial length and the removable portion.

3. The method of claim 1 further comprising the steps of:
    covering the roof truss with a roofing material;
    taking off the roofing material in a desired section at a future time after the step of covering; and
    cutting the non-structural top chord into the partial length and the removable portion after the step of taking off the roofing material.

4. The method of claim 1 wherein the partial length is located at the peak of the truss.

5. The method of claim 1 wherein the partial length is provided during manufacture of the truss, and wherein the removable portion is a space extending from the partial length to the gutter line of the truss.

6. The method of claim 1 wherein the solar panel assembly comprises:
    a panel enclosure having a bottom and two opposite side walls;
    a channel positioned near an upper edge of each of the side walls, wherein the channel is capable of receiving a solar panel; and
    a solar panel placed in the channel of the panel enclosure.

7. The method of claim 6 wherein the solar panel assembly comprises a plurality of panel enclosures, the method further comprising the steps of:
    positioning a backing sheet on the first upper surface in the recessed space;
    placing the plurality of panel enclosures onto the backing sheet; and
    joining adjacent panel enclosures together and to the backing sheet with joining elements.

8. The method of claim 1 further comprising the step of positioning a backing sheet over the first upper surface in the recessed space.

9. The method of claim 1 further comprising the step of installing a panel enclosure into the recessed space, where the panel enclosure has a side wall, wherein the side wall has a channel near an upper edge of the side wall, and wherein the channel is capable of receiving a solar panel.

10. The method of claim 1 further comprising the step of installing a solar panel into the recessed space, wherein the solar panel is approximately flush with the roof line.

11. The method of claim 1 further comprising the step of installing a solar panel into the recessed space, wherein the solar panel is positioned to provide a gap below the solar panel, wherein the air space allows air or fluid flow to a gutter line of the roof.

* * * * *